United States Patent
Chang

(10) Patent No.: US 9,207,731 B2
(45) Date of Patent: Dec. 8, 2015

(54) DATA SWITCH WITH POWER BUDGETING

(75) Inventor: Tsun-Yao Chang, Roseville, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 236 days.

(21) Appl. No.: 13/475,677

(22) Filed: May 18, 2012

(65) Prior Publication Data

US 2013/0311793 A1    Nov. 21, 2013

(51) Int. Cl.
| | | |
|---|---|---|
| G06F 1/00 | (2006.01) |
| G06F 1/26 | (2006.01) |
| G06F 1/32 | (2006.01) |
| G06F 1/20 | (2006.01) |
| G06F 9/50 | (2006.01) |
| G06F 1/28 | (2006.01) |
| H04L 12/10 | (2006.01) |

(52) U.S. Cl.
CPC .............. *G06F 1/206* (2013.01); *G06F 1/266* (2013.01); *G06F 1/28* (2013.01); *G06F 9/5094* (2013.01); *G06F 1/26* (2013.01); *G06F 1/3203* (2013.01); *H04L 12/10* (2013.01)

(58) Field of Classification Search
CPC ....... G06F 1/3203; G06F 1/4401; G06F 1/26; G06F 1/10; G06F 1/12; G06F 1/08; G06F 1/14
USPC .......... 713/300, 32, 324, 340, 100, 1
See application file for complete search history.

(56) References Cited

U.S. PATENT DOCUMENTS

| | | | |
|---|---|---|---|
| 7,554,783 B2 | 6/2009 | Heath et al. | |
| RE40,866 E * | 8/2009 | Fung | 713/300 |
| 7,577,862 B2 | 8/2009 | McClendon et al. | |
| 7,661,003 B2 * | 2/2010 | Naffziger et al. | 713/320 |
| 7,698,578 B2 | 4/2010 | Williams et al. | |
| 7,797,560 B2 | 9/2010 | Diab | |
| 7,821,246 B2 * | 10/2010 | Koertzen et al. | 323/349 |
| 7,904,734 B1 * | 3/2011 | Singla et al. | 713/300 |
| 8,751,836 B1 * | 6/2014 | Piszczek et al. | 713/300 |
| 2002/0004915 A1 * | 1/2002 | Fung | 713/320 |
| 2003/0056125 A1 * | 3/2003 | O'Conner et al. | 713/300 |
| 2003/0208668 A1 * | 11/2003 | To et al. | 711/200 |
| 2005/0272402 A1 * | 12/2005 | Ferentz et al. | 455/402 |
| 2006/0053324 A1 * | 3/2006 | Giat et al. | 713/300 |
| 2006/0117194 A1 * | 6/2006 | Nishida | 713/300 |
| 2007/0016806 A1 * | 1/2007 | Prosperi | 713/300 |
| 2008/0072090 A1 * | 3/2008 | O'Connor et al. | 713/330 |
| 2009/0228723 A1 * | 9/2009 | Yoshizaki | 713/300 |
| 2009/0326727 A1 * | 12/2009 | Gothard | 700/292 |
| 2010/0169676 A1 * | 7/2010 | Nakagawa et al. | 713/300 |

(Continued)

OTHER PUBLICATIONS

Jung, et al. Flow-Through-Queue based Power Management for Gigabit Ethernet Controller.

*Primary Examiner* — Ji H Bae
(74) *Attorney, Agent, or Firm* — Hewlett-Packard Patent Department

(57) ABSTRACT

A controller of a data switch determines a power budget based upon respective capacities of power supplies coupled thereto. Operating power is allocated to requesting network devices in accordance with the power budget. The power budget can be re-determined periodically, in response to changes in operating temperature, or in accord with other factors and the power allocation adjusted accordingly. Operating power provision to network devices can be managed so as to maintain a greatest allowable level of system operation while protecting power supplies against thermally-related or overload damage.

14 Claims, 3 Drawing Sheets

(56) References Cited

U.S. PATENT DOCUMENTS

| | | | |
|---|---|---|---|
| 2010/0169690 A1* | 7/2010 | Mundada et al. | 713/340 |
| 2010/0211680 A1* | 8/2010 | Chatterton et al. | 709/226 |
| 2011/0161685 A1* | 6/2011 | Lin et al. | 713/300 |
| 2011/0301777 A1 | 12/2011 | Cox et al. | |
| 2012/0066519 A1* | 3/2012 | El-Essawy et al. | 713/300 |

* cited by examiner

| TEMP RANGE | POWER CAPACITY |
|---|---|
| LESS THAN 45C | 1000 WATTS |
| 45C - 51C | 900 WATTS |
| 51C - 55C | 800 WATTS |
| OVER 55C | SHUTDOWN |

DATA SWITCH WITH POWER BUDGETING

BACKGROUND

A network data switch (NDS) operates to couple one or more network devices in data communication with each other and a network. A power supply or supplies provides the power needed by the NDS and the network devices coupled thereto. Many such installations are housed in rooms, utility closets or other spaces having minimal—if any—cooling resources. None the less, most such network installations have operated satisfactorily due to the relatively low power requirements of traditional "data only" network devices.

However, a growing number of network devices, such as Power over Ethernet (PoE) devices, perform a myriad of peripheral functions and demand considerably great operating power. Such increased power demands can tax the supply or supplies serving the associated NDS, resulting in greater temperature rise in the installation space and thermally-related equipment shutdowns, shortened service life, and so on. The present teachings address the foregoing and related concerns.

BRIEF DESCRIPTION OF THE DRAWINGS

The present embodiments will now be described, by way of example, with reference to the accompanying drawings, in which.

DETAILED DESCRIPTION

Introduction

A controller of a data switch determines a power budget based upon the respective power capacities of the power supplies coupled thereto. Operating power is then allocated to requesting network devices in accordance with the power budget. The power budget can be re-determined periodically, in response to changes in operating temperature, or in accordance with other factors. The power allocation is then adjusted accordingly. Operating power provision to network devices can be managed so as to maintain a greatest allowable level of system operation while protecting power supplies against thermally-related or overload damage.

In one example, a network data switch includes one or more connectors each configured to be coupled to a power supply. The network data switch also includes one or more ports, each configured to be coupled in data communication to a network device. Each port is configured to provide operating power to the network device. The network data switch further includes a controller configured to receive a temperature value for each power supply. The controller is configured to determine a power capacity correlated to the temperature value for each power supply. The controller is also configured to determine a power budget in accordance with the power capacities, and to allocate operating power to selected ones of the network devices in accordance with the power budget.

In another example, a storage media includes a program code, the program code being configured to cause a processor of a network data switch to derive a power budget by way of temperature correlated power capacities of one or more power supplies coupled to the network data switch. The program code is also configured to cause the processor of the network data switch to allocate operating power to selected ones of network devices coupled to the network data switch in accordance with the power budget.

In yet another example, a method is performed using a network data switch, the method including determining a power capacity correlated to a temperature for each of one or more power supplies coupled to the network data switch. The method also includes determining a power budget in accordance with the power capacities. The method further includes allocating operating power to selected ones of network devices coupled to the network data switch in accordance with the power budget.

First Illustrative System

Figure 1:
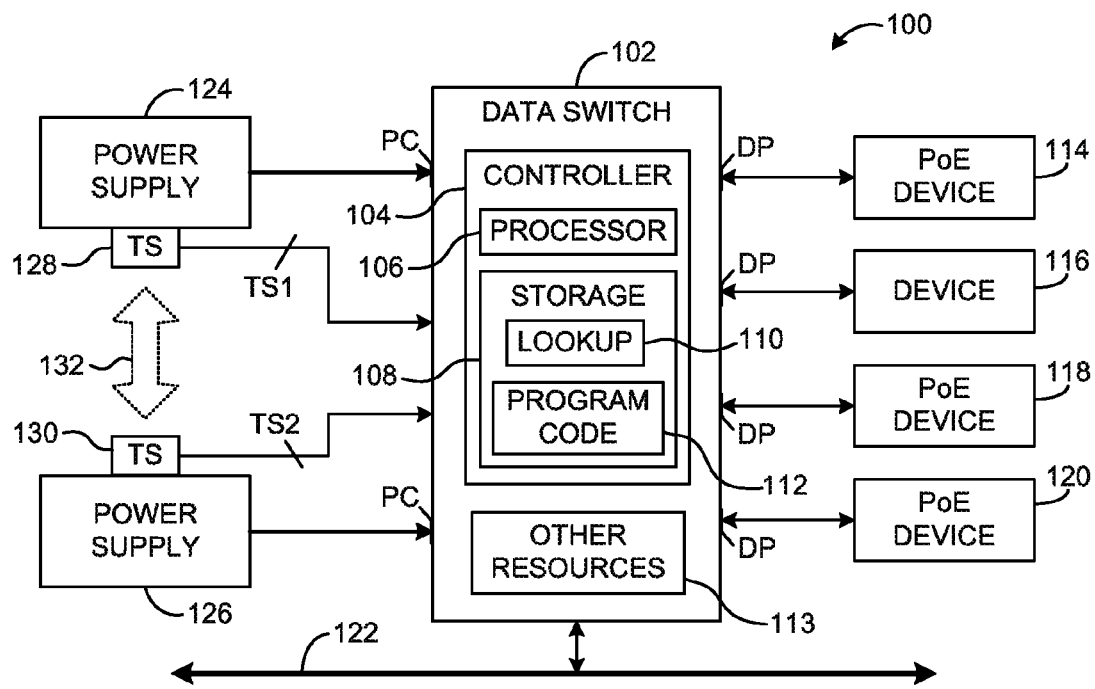
FIG. 1 depicts a block diagram of a system including a data switch according to one example of the present teachings.

Attention is now turned to FIG. 1, which depicts a system 100 according to the present teachings. The system 100 is illustrative and non-limiting with respect to the present teachings. Other systems, data switches, network devices, and apparatus having other respective characteristics can also be defined and used. In at least one example, the system 100 defines a portion of a wide-area network (WAN) or a local-area network (LAN).

The system 100 includes a data switch 102. The data switch 102 includes respective data ports "DP" configured to couple a plurality of network devices in data communication with each other and with a network. Thus, the data switch 102 functions in the routing of data signals or "packets" between their respective origins and destinations. The data switch 102 includes a controller 104. The controller 104 includes a processor 106. The processor 106 can be defined by any suitable microprocessor or microcontroller configured to operate in accordance with a machine-readable program code.

The controller 104 also includes an electronically-accessible storage media (storage) 108. The storage 108 can be defined by or include any suitable element or elements including, without limitation: a solid-state memory, a magnetic storage disk, an optical storage disk, non-volatile memory, a reprogrammable memory, and so on. Other suitable tangible forms of storage 108 can also be used. The storage 108 includes (i.e., stores or retains) a lookup table (lookup) 110 and a program code 112 that are respectively accessible by the processor 106. The program code 112 is configured (i.e., written, or structured) to cause the processor 106 to perform various normal operations in accordance with the present teachings.

The data switch 102 includes other resources 113. Non-limiting examples of such other resources 113 include electrical power switching circuitry, data communications circuitry, Ethernet protocol circuitry, an encryption key or keys stored in firmware, wireless signaling resources, status indicating lights or displays, a user interface, and so on. The other resources 113 can include any suitable constituency as required for normal operations of the data switch 102, and further elaboration is not germane to the present teachings.

The system 100 includes network devices 114, 116, 118 and 120, respectively. The network devices 114, 118 and 120 are defined by power over Ethernet (PoE) devices and each is configured to perform one or more peripheral functions in addition to data communication. Non-limiting examples of such PoE devices include a wireless network access point, an Internet protocol (IP) telephone, a pan-tilt-zoom security camera, and so on. Other suitable PoE devices can also be used. The network device 116 is generally a data communications-only type of device and has minimal operating power requirements relative to that of the PoE devices 114, 118 and 120. The particular network devices 114-120 are illustrative and non-limiting, and the present teachings contemplate other systems having any respective numbers of other network devices.

The system 100 also includes respective power supplies 124 and 126 coupled and configured to provide conditioned electrical energy to the data switch 102 by way of respective power connectors "PC". Such electrical conditioning can include voltage regulation, current regulation or limiting, and so on. Other suitable types of electrical conditioning can also be used. For non-limiting example, each of the power supplies 124 and 126 is configured to provide as much as one-thousand watts of direct-current electrical energy to the data switch 102. Other configurations and power values can also be used.

The system 100 also includes a temperature sensor (sensor) 128 associated with the power supply 124, and a temperature sensor 130 associated with the power supply 126. Each sensor 128 and 130 is configured to sense a temperature of ambient air 132 as it flows into the associated power supply 124 or 126 and to provide a corresponding temperature signal "TS1" or "TS2" to the data switch 102. Thus, each sensor (128, 130) is configured to communicate an operating temperature of, or corresponding to, a respective power supply (124, 126) to the data switch 102.

Normal, illustrative operation of the system 100 is as follows: The network devices 114-120 are coupled in data communication with each other and the network 122 by way of the data switch 102. Additionally, each PoE device 114, 118 and 120 is configured to request a particular value (i.e., amps or watts) of operating power from the data switch 102 as required to support its respective peripheral function(s).

The data switch 102 is configured to receive the respective signals TS1 and TS2 from the temperature sensors 128 and 130. The controller 104 then accesses the lookup table 110 within storage 108 and determines (i.e., reads or cross-references) a respective power capacity for each power supply 124 and 126 in accordance with the corresponding temperature signals.

The controller 104 then determines (i.e., calculates) a total, instantaneous power budget based upon the respectively determined power capacities. The controller 104 thereafter selectively provides or denies (i.e., allocates) operating electrical power to each of the PoE devices 114, 118 and 120 in accordance with the power budget.

The controller 104 can be configured to re-determine the power budget periodically, in response to a predetermined threshold change in one or more temperature signals, or in accordance with other schema. In one non-limiting example, the controller 104 re-determines the power budget in one-minute increments. In another non-limiting example, the controller 104 re-determines the power budget in response to sensing a five-degree change in at least one of the temperature signals. Other operations can also be performed. The allocation of operating power can be adjusted or changed in accordance with each newly determined power budget.

Second Illustrative System

Figure 2:
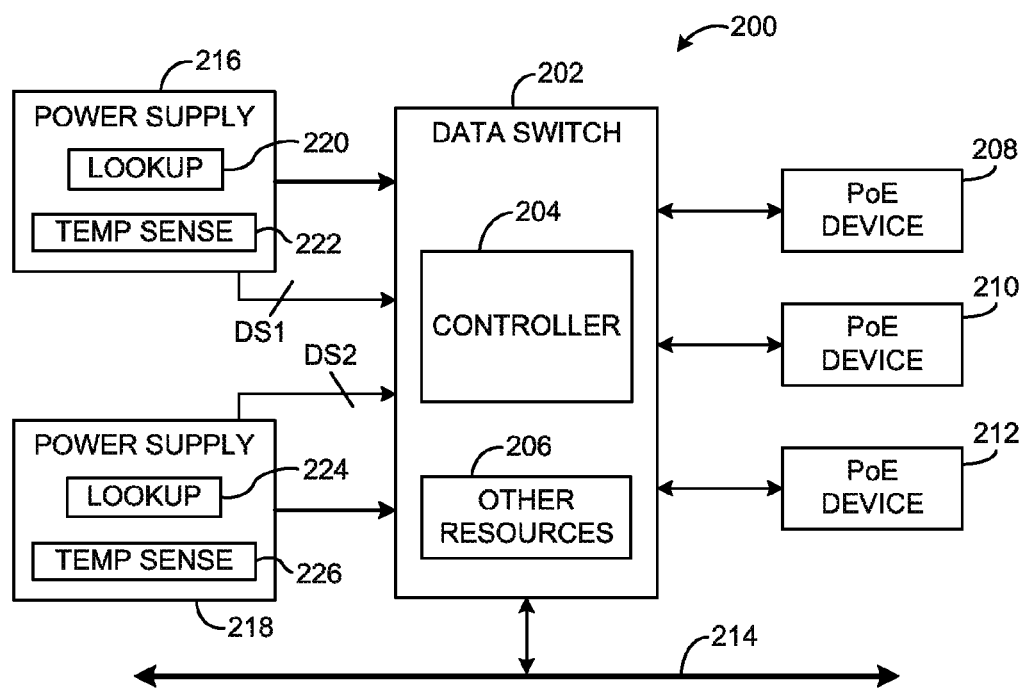
FIG. 2 depicts a block diagram of a system according to another example.

Reference is made now to FIG. 2, which depicts a system 200 according to the present teachings. The system 200 is illustrative and non-limiting with respect to the present teachings. Other systems, data switches, network devices, and apparatus having other respective characteristics can also be defined and used. In at least one example, the system 200 defines a portion of a WAN or a LAN.

The system 200 includes a data switch 202. The data switch 202 includes a controller 204 and other resources 206. In one example, the controller 204 is analogous in constituency and configuration to the controller 104, except as described below. The controller 204 includes circuitry or resources configured to communicate with power supplies as described hereinafter. Other suitable configurations or constituencies can also be used. The other resources 206 can be variously defined and configured in accordance with normal operations and functions of the data switch 202. In one example, the other resources 206 are essentially the same in constituency and configuration as the other resources 113 described above. Other configurations and constituents can also be used.

The system 200 includes PoE devices 208, 210 and 212, respectively. The PoE devices 208-212 are configured to perform one or more peripheral functions. The PoE devices 208-212 are coupled in data communication with each other and a network 214 by way of the data switch 202.

The system 200 further includes respective power supplies 216 and 218. The power supplies 216 and 218 are each configured to provide conditioned electrical energy to the data switch 202. The power supply 216 also includes a lookup table 220 and a temperature sensor 222. The lookup table 220 includes correlated power capacity and temperature values for the power supply 216. The temperature sensor 222 measures an internal operating temperature of the power supply 216 and provides corresponding signaling. The power supply 216 is further configured to communicate temperature, power capacity, or correlated temperature/power data to the data switch 202 by way of data signals "DS1".

In turn, the power supply 218 includes a lookup table 224 and a temperature sensor 226. The lookup table 224 includes correlated power capacity and temperature values for the power supply 218, while the temperature sensor 226 provides signaling in accordance with an internal operating temperature of the power supply 218. The power supply 218 is configured to communicate temperature, power capacity, or correlated power/temperature data to the data switch 202 by way of data signals "DS2". Thus, each of the power supplies 216 and 218 can also be referred to as a "smart power supply".

Normal, illustrative operation of the system 200 is as follows: The PoE devices 208-212 are coupled in data communication with each other and the network 214 by way of the data switch 202. Additionally, each PoE device 208-212 is configured to request a particular operating power value from the data switch 202 as required to support its respective peripheral function(s).

The data switch 202 receives (or queries) the signals DS1 and DS2 from the power supplies 216 and 218, respectively. In one non-limiting illustration, the signals DS1 and DS2 convey respective operating temperature and correlated temperature/power data values to the data switch 202. The controller 204 then determines a total power budget based upon the respectively provided data. The controller 204 thereafter allocates (i.e., selectively provides or denies) operating power to each of the PoE devices 208-212 in accordance with the power budget.

The controller 204 can be configured to re-determine the power budget periodically, in response to a change in temperature values, in response to a communication received from either power supply 216 or 218, or in accordance with other schema. In one non-limiting example, the controller 204 recalculates the power budget in two-minute increments. In another non-limiting example, the controller 204 re-determines the power budget in response to a request to decrease power demand received from the power supply 218. Other operations can also be performed.

Third Illustrative System

Figures 3, 4:
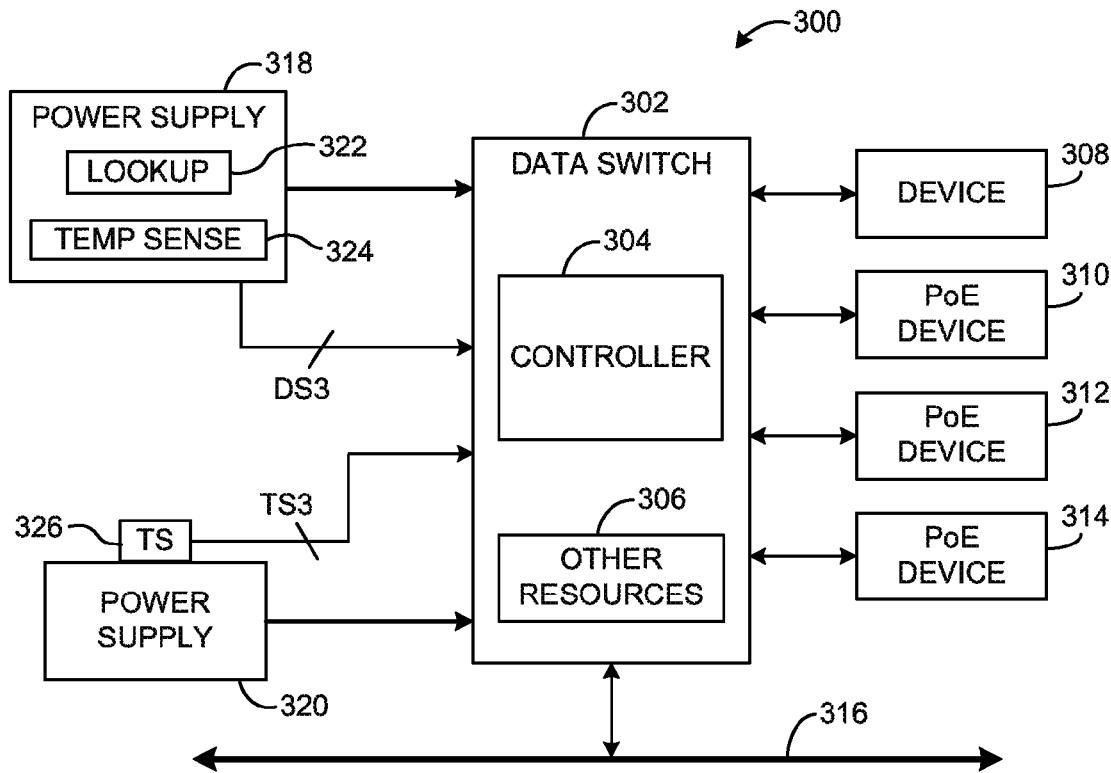
FIG. 3 depicts a block diagram of a system according to yet another example.
FIG. 4 depicts a table of correlated temperature and power capacity values according to another example of the present teachings.

Attention is turned now to FIG. 3, which depicts a system 300 in accordance with the present teachings. The system 300 is illustrative and non-limiting with respect to the present teachings. Other systems, data switches, network devices, and apparatus having other respective characteristics can also be defined and used. In one or more examples, the system 300 defines a portion of a WAN or a LAN.

The system 300 includes a data switch 302. The data switch 302 includes a controller 304 and other resources 306. In one example, the controller 304 is analogous in constituency and configuration to the controller 104 except as described below. The controller 304 includes circuitry or resources configured to communicate with power supplies as described hereinafter. Other suitable configurations or constituencies can also be used. The other resources 306 can be variously defined and configured. In one example, the other resources 306 are analogous to the other resources 113 described above. Other configurations and constituents can also be used.

The system 300 includes a network device 308 and respective PoE devices 310, 312 and 314. Each of the PoE devices 310-314 is configured to perform one or more peripheral functions. The network device 308 and the PoE devices 310-314 are coupled in data communication with each other and a network 316 by way of the data switch 302.

The system 300 further includes respective power supplies 318 and 320. The power supplies 318 and 320 are each configured to provide conditioned electrical energy to the data switch 302. The power supply 318 also includes a lookup table 322 and a temperature sensor 324. The lookup table 322 includes correlated power capacity and temperature values for the power supply 318. The temperature sensor 324 measures internal operating temperature and provides corresponding signaling (or data). The power supply 318 is further configured to communicate temperature, power capacity, or correlated temperature/power data to the data switch 302 by way of a data signal "DS3". Thus, the power supply 318 is also a "smart power supply" according to the present teachings.

The power supply 320 is lacking both a lookup table and a built-in temperature sensor. Thus, the power supply 320 is analogous to the power supply 124 described above. The system 300 includes a temperature sensor 326 configured to provide a temperature signal "TS3" of, or corresponding to, the present operating temperature of the power supply 320. The controller 304 of the data switch 302 includes a lookup table (e.g., 110) within storage (e.g., 108) including correlated temperature-versus-capacity values for the power supply 320.

Normal, illustrative operation of the system 300 is as follows: The network devices 308 and the PoE devices 310-314 are coupled in data communication with each other and the network 316 by way of the data switch 302. Additionally, each PoE device 310-314 is configured to request a particular value of operating power from the data switch 302 as required to support its respective peripheral function(s).

The data switch 302 is configured to receive the temperature signal TS3 from the temperature sensor 326. The controller 304 accesses its own lookup table and determines a respective power capacity for the power supply 320 accordingly. The data switch 302 additionally receives the signals DS3, which conveys operating temperature and correlated temperature/power data values to the data switch 302.

The controller 304 then determines a total power budget based upon the respective data. The controller 304 thereafter allocates operating power to each of the PoE devices 310-314 in accordance with the power budget. Subsequent re-determination of the power budget and corresponding changes in power allocation can be performed generally as described above.

Illustrative Table of Correlated Values

Reference is now made to FIG. 4, which depicts a table 400 of correlated temperature and power capacity values for an illustrative power supply (e.g., 124). The table 400 is illustrative and non-limiting with respect to the present teachings. Other correlated values corresponding to other examples are also contemplated.

The table 400 includes a first correlated data pair 402. The data pair 402 includes a temperature range of lesser than forty-five degrees Celsius (C), which corresponds to a power capacity of one-thousand watts. That is, the illustrative power supply is rated to provide one-thousand watts of electrical power to a load (i.e., a data switch and associated network devices) when the operating temperature of that power supply is lesser than forty-five Deg. C.

In turn, the table 400 includes other respective correlated data pairs 404, 406 and 408. The data pairs 404 and 406 include respective operating temperature ranges and corresponding power capacities. The data pair 408 indicates that for operating temperatures greater than fifty-five Deg. C, the power supply will assume an automatic shutdown mode in order to prevent thermally-related damage.

Illustrative Method

Figure 5:
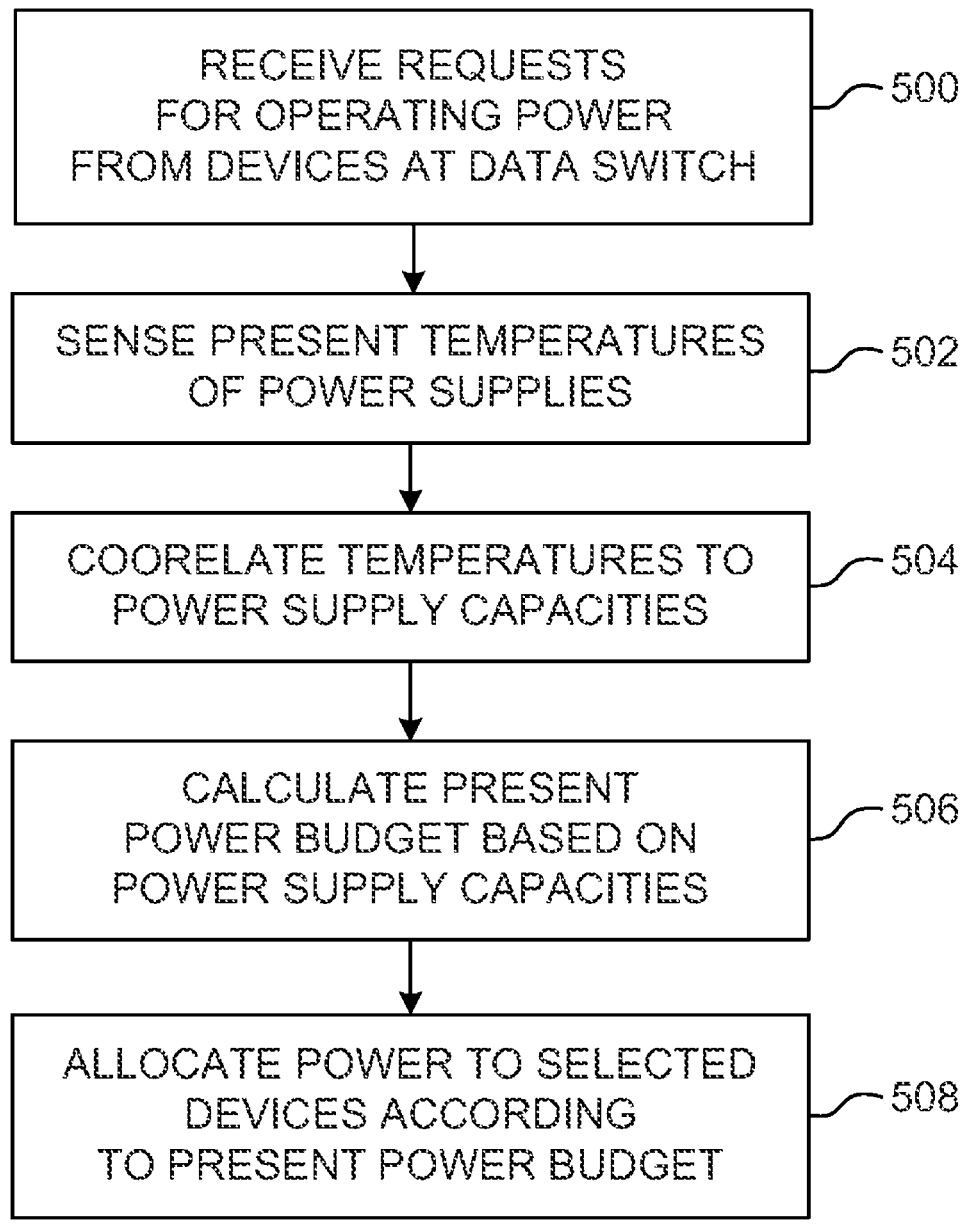
FIG. 5 depicts a flow diagram in accordance with an example of the present teachings.

Reference is made now to FIG. 5, which depicts a flow diagram of a method according to the present teachings. The flow diagram depicts particular steps performed in a specific order of execution. However, other methods including other steps, omitting one or more of the depicted steps, or proceeding in other orders of execution can also be used. Thus, the method of FIG. 5 is illustrative and non-limiting with respect to the present teachings.

At 500, requests for operating power are received from network devices at a data switch. For purposes of a present example, the data switch 302 receives requests for operating power from PoE devices 310, 312 and 314. Such requests are for twenty watts, twenty-two watts and twenty-four watts, respectively, thus totaling sixty-six watts, for purposes of the present illustration.

At 502, the present temperatures of power supplies coupled to the data switch are sensed. For purposes of the present example, temperature data within the signal DS3 and the temperature signal TS3 are read (or accessed) by the controller 304. The controller 304 now has respective, instantaneous operating temperature values for the power supplies 318 and 320.

At 504, the present temperature values are correlated to power capacities for the power supplies. In the present example, the controller 304 determines a power capacity value for the power supply 318 by way of temperature/power data within the signal DS3. The controller 304 also accesses an internal lookup table and determines a power capacity value correlated to the present temperature for the power supply 320. The controller 304 has thus determined respective power capacities for the power supplies 318 and 320. For purposes of illustration, the determined power capacities are one-hundred watts and fifty watts, respectively.

At 506, a present power budget is calculated based on the power capacities. For purpose of the present example, the controller 304 adds the power capacities determined at 504 above and calculates a present power budget of one-hundred fifty watts.

At 508, operating power is allocated to selected devices according to the present power budget. For purposes of the present example, the controller 304 causes operating electrical power to be provided to each of the PoE devices 310, 312 and 314. The total power requested is sixty-six watts, which is lesser than the one-hundred fifty watts power budget. Thus, all requests for operating power are granted, with an eighty-four watt margin remaining. The method of FIG. 5 is now complete for a single iteration, and can be repeated in accordance with increments of time, in response to changes in temperature or received data, and so on.

The present teachings contemplate any number of examples in which a controller of a data switch determines a present power budget based upon operating temperatures and power capacities for power supplies coupled thereto. The controller then allocates operating power—that is, selectively provides or denies—operating power to requesting network devices in accordance with that power budget. The power budget can be subject to redetermination and the power allocation changed or adjusted according to periodic cycling, in response to newly received data values or requests, or by way of other stratagems.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A network data switch, comprising:
   connectors to couple to respective power supplies;
   ports to communicate data with respective network devices, each port of the ports to provide operating power to the respective network device;
   a controller within the network data switch and including an electronically-accessible non-transitory storage media to store a lookup table, the lookup table including temperature values and power capacities correlated to the temperature values for the power supplies, the controller programmed to:
      route data packets from a first of the network devices to a second of the network devices,
      receive temperature values for the respective power supplies,
      determine, based on the lookup table, a power capacity for each respective power supply of the power supplies, the determined power capacity correlated to the temperature value for the respective power supply,
      determine a power budget in accordance with the power capacities, and
      allocate operating power to selected ones of the network devices in accordance with the power budget.

2. The network data switch according to claim 1, at least one of the network devices being a power over Ethernet (PoE) network device.

3. The network data switch according to claim 1, wherein the non-transitory storage media stores machine-readable program code, the program code upon execution to cause the controller to perform the routing the data packets, the receiving the temperature values, the determining the power capacities, the determining the power budget, and the allocating the operating power.

4. The network data switch according to claim 1, the controller further programmed to receive a request for a particular operating power value from a given one of the network devices, wherein the allocating comprises denying the request in response to the determined power budget.

5. The network data switch according to claim 1, wherein the power budget is determined by adding the power capacities for the respective power supplies.

6. The network data switch according to claim 1, wherein a given port of the ports is to provide power over Ethernet to a respective network device of the network devices.

7. The network data switch according to claim 1, wherein the controller is programmed to route the data packets according to an Ethernet protocol.

8. A non-transitory storage media storing program code, the program code configured to cause a network data switch to:
   route data packets from a first network device of a plurality of network devices to a second network device of the plurality of network devices;
   determine temperature correlated power capacities of power supplies coupled to the network data switch by accessing a lookup table stored in non-transitory storage media of the network data switch, the lookup table including different temperatures and correlating the different temperatures to corresponding power capacities;
   derive a power budget based on the temperature correlated power capacities of the power supplies; and
   allocate operating power to selected network devices of the plurality of network devices coupled to the network data switch in accordance with the power budget.

9. The non-transitory storage media according to claim 8, wherein each of the temperature correlated power capacities is for a respective power supply of the power supplies and varies based on a sensed temperature for the respective power supply.

10. The non-transitory storage media according to claim 9, wherein the power budget is derived by adding the temperature correlated power capacities.

11. A method comprising:
   routing, by a network data switch, data packets from a first network device of a plurality of network devices to a second network device of the plurality of network devices;
   determining, by the network data switch, a power capacity correlated to a temperature for each power supply of power supplies coupled to the network data switch, wherein the determining the power capacities is performed by accessing a lookup table of the network data switch, the lookup table including different temperatures and correlating the different temperatures to corresponding power capacities;
   determining, by the network data switch, a power budget based on the power capacities; and
   allocating, by the network data switch, operating power to selected network devices of the plurality of network devices coupled to the network data switch in accordance with the power budget.

12. The method according to claim 11, further comprising:
   receiving a request from a given one of the network devices for a particular operating power, wherein the allocating includes denying operating power to the given network device in accordance with the power budget.

13. The method according to claim 11, wherein the power capacity for each respective power supply varies with temperature for the respective power supply, and wherein the power budget is determined by adding the power capacities for the respective power supplies.

14. The method according to claim 11, wherein the routing the data packets is according to an Ethernet protocol.

* * * * *